US012012948B2

(12) United States Patent
Hayama et al.

(10) Patent No.: US 12,012,948 B2
(45) Date of Patent: Jun. 18, 2024

(54) CAPACITY CONTROL VALVE

(71) Applicant: EAGLE INDUSTRY CO., LTD., Tokyo (JP)

(72) Inventors: Masahiro Hayama, Tokyo (JP); Kohei Fukudome, Tokyo (JP); Takahiro Ejima, Tokyo (JP); Daichi Kurihara, Tokyo (JP); Wataru Takahashi, Tokyo (JP); Keigo Shirafuji, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 545 days.

(21) Appl. No.: 17/258,708

(22) PCT Filed: Aug. 7, 2019

(86) PCT No.: PCT/JP2019/031068
§ 371 (c)(1),
(2) Date: Jan. 7, 2021

(87) PCT Pub. No.: WO2020/032088
PCT Pub. Date: Feb. 13, 2020

(65) Prior Publication Data
US 2021/0285434 A1    Sep. 16, 2021

(30) Foreign Application Priority Data
Aug. 8, 2018  (JP) .................................. 2018-149804

(51) Int. Cl.
*F04B 27/18*  (2006.01)
*B60H 1/32*  (2006.01)

(52) U.S. Cl.
CPC ....... *F04B 27/1804* (2013.01); *B60H 1/3216* (2013.01); *B60H 1/3223* (2013.01);
(Continued)

(58) Field of Classification Search
CPC .......... F04B 27/1804; F04B 2027/1809; F04B 2027/1827; F04B 2027/1831; F04B 2027/1845; B06H 1/3216; B06H 1/3223
See application file for complete search history.

(56) References Cited

U.S. PATENT DOCUMENTS

| 2,617,621 A | 11/1952 | James ..................... F16K 41/10 |
| 3,787,023 A | 1/1974 | Shufflebarger .......... F16K 41/10 |
(Continued)

FOREIGN PATENT DOCUMENTS

| EP | 1081378 | 3/2001 | ............. F04B 27/18 |
| EP | 2594794 | 5/2013 | ............. F04B 27/18 |
(Continued)

OTHER PUBLICATIONS

U.S. Appl. No. 17/259,138, filed Jan. 8, 2021, Hayama et al.
(Continued)

*Primary Examiner* — Daphne M Barry
(74) *Attorney, Agent, or Firm* — HAYES SOLOWAY P.C.

(57) ABSTRACT

A capacity control valve includes a valve housing formed with a discharge port, a suction port, and first and second control ports, a rod movably arranged in the valve housing and driven by a solenoid, a CS valve configured to control a fluid flow between the first control port and the suction port in accordance with a movement of the rod, and a DC valve configured to control a fluid flow between the second control port and the discharge port in accordance with the movement of the rod. In a non-energization state, the CS valve is closed and the DC valve is closed. As the energization of the solenoid becomes larger, the CS valve transitions from a closed state to an open state and the DC valve transitions from a closed state to an open state.

20 Claims, 10 Drawing Sheets

(52) U.S. Cl.
CPC ............... *F04B 2027/1809* (2013.01); *F04B 2027/1827* (2013.01); *F04B 2027/1831* (2013.01); *F04B 2027/1845* (2013.01)

(56) References Cited

U.S. PATENT DOCUMENTS

| | | | |
|---|---|---|---|
| 4,166,607 | A | 9/1979 | Webb ................. F16K 1/10 |
| 4,687,419 | A | 8/1987 | Suzuki ............ F04B 27/1804 |
| 6,010,312 | A | 1/2000 | Suitou et al. ............ F04B 1/26 |
| 6,062,823 | A | 5/2000 | Kawaguchi ......... F04B 27/1804 |
| 6,354,811 | B1 | 3/2002 | Ota et al. ................... 417/222.2 |
| 6,358,017 | B1 | 3/2002 | Ota et al. ................... 417/222.2 |
| 6,361,283 | B1 | 3/2002 | Ota et al. ................... 417/222.2 |
| 6,485,267 | B1 | 11/2002 | Imai et al. ................ F04B 1/26 |
| 6,772,990 | B2 | 8/2004 | Sasaki ................ F16K 31/0627 |
| 7,806,666 | B2 | 10/2010 | Umemura ........... F04B 27/1804 |
| 8,021,124 | B2 | 9/2011 | Umemura et al. ......... 417/222.2 |
| 8,079,827 | B2 | 12/2011 | Iwa et al. .................. 417/222.2 |
| 8,757,988 | B2 | 6/2014 | Fukudome .......... F04B 27/1804 |
| 9,132,714 | B2 | 9/2015 | Futakuchi .......... B60H 1/00485 |
| 9,523,987 | B2 | 12/2016 | Fukudome .......... G05D 7/0106 |
| 9,568,108 | B2 | 2/2017 | Takahashi ........ F16J 15/3496 |
| 9,732,874 | B2 | 8/2017 | Saeki ............. F04B 27/1804 |
| 9,777,863 | B2 | 10/2017 | Higashidozono ... F04B 27/1804 |
| 9,964,102 | B2 | 5/2018 | Kondo ................ F04B 27/1045 |
| 10,697,548 | B2 | 6/2020 | Iguchi .................. F16J 15/34 |
| 10,781,804 | B2 | 9/2020 | Higashidozono et al. ................... F04B 27/18 |
| 10,883,606 | B2 | 1/2021 | Takigahria ........... F16J 15/3452 |
| 11,053,933 | B2 | 7/2021 | Warren ............. F04B 27/1804 |
| 11,085,431 | B2 | 8/2021 | Fukudome ............. F04B 27/18 |
| 11,156,301 | B2 | 11/2021 | Hayama ............. F16K 31/0627 |
| 11,225,962 | B2 | 1/2022 | Kurihara ............. G05D 7/0635 |
| 11,319,940 | B2 | 5/2022 | Hayama ............. F16K 11/0716 |
| 11,326,585 | B2 | 5/2022 | Hayama et al. .... F04B 27/1009 |
| 11,359,624 | B2 | 6/2022 | Kurihara et al. ........ F04B 49/12 |
| 11,454,227 | B2 | 9/2022 | Hayama ............. F04B 27/18 |
| 11,473,684 | B2 | 10/2022 | Hayama ............. G04B 27/1804 |
| 11,480,166 | B2 | 10/2022 | Hayama ............. F16K 31/0603 |
| 11,519,399 | B2 | 12/2022 | Kurihara ................ F04B 49/22 |
| 11,536,257 | B2 | 12/2022 | Hayama ............. F04B 27/10 |
| 11,542,931 | B2 | 1/2023 | Hayama ................. F04B 49/22 |
| 11,555,489 | B2 | 1/2023 | Hayama .................. F04B 27/10 |
| 2004/0060604 | A1 | 4/2004 | Uemura et al. ............... 137/595 |
| 2005/0035321 | A1 | 2/2005 | Uemura ............... F16K 27/041 |
| 2005/0287014 | A1 | 12/2005 | Umemura ........... F04B 27/1804 |
| 2006/0218953 | A1 | 10/2006 | Hirota ............................ 62/228.5 |
| 2007/0214814 | A1 | 9/2007 | Umemura et al. ............ 62/228.1 |
| 2008/0138213 | A1 | 6/2008 | Umemura ........... F04B 27/1804 |
| 2009/0108221 | A1 | 4/2009 | Umemura ........... F04B 27/1804 |
| 2009/0183786 | A1 | 7/2009 | Iwa et al. ................... 137/487.5 |
| 2012/0198992 | A1 | 8/2012 | Futakuchi et al. ............... 91/505 |
| 2012/0198993 | A1 | 8/2012 | Fukudome et al. .... F04B 27/18 |
| 2013/0126017 | A1 | 5/2013 | Ota et al. ............. F04B 27/1804 |
| 2014/0130916 | A1 | 5/2014 | Saeki ................. F04B 27/1804 |
| 2015/0004010 | A1 | 1/2015 | Saeki ................. F04B 27/1804 |
| 2015/0010410 | A1 | 1/2015 | Saeki et al. ........... F04B 49/225 |
| 2015/0068628 | A1 | 3/2015 | Iwa et al. ................ F16K 31/06 |
| 2015/0211506 | A1 | 7/2015 | Shirafuji et al. .... F04B 27/1804 |
| 2015/0345655 | A1 | 12/2015 | Higashidozono et al. ................... F16K 31/0624 |
| 2016/0290326 | A1 | 10/2016 | Sugamura ......... F04B 27/1804 |
| 2017/0175726 | A1 | 6/2017 | Kume ................ F04B 27/1804 |
| 2017/0028462 | A1 | 10/2017 | Hayama et al. ........ F16K 47/06 |
| 2017/0284562 | A1 | 10/2017 | Hayama et al. ........ F16K 47/06 |
| 2017/0356430 | A1 | 12/2017 | Irie et al. ............. F04B 27/1804 |
| 2018/0291888 | A1 | 10/2018 | Tonegawa ........... F16K 31/0624 |
| 2020/0362974 | A1 | 11/2020 | Hayama ................. F04B 49/22 |
| 2021/0285433 | A1 | 9/2021 | Hayama ............. F04B 27/1804 |
| 2022/0034414 | A1 | 2/2022 | Ito ........................... F04B 27/18 |

FOREIGN PATENT DOCUMENTS

| | | | |
|---|---|---|---|
| EP | 2 784 320 | 10/2014 | ............. F04B 27/18 |
| EP | 3 431 760 | 1/2019 | ............. F04B 27/18 |
| JP | 5-306679 | 11/1993 | ............. F04B 27/08 |
| JP | 6-200875 | 7/1994 | ............. F04B 27/08 |
| JP | 7-27049 | 1/1995 | ............. F04B 27/10 |
| JP | 9-144929 | 6/1997 | ............. F16K 31/06 |
| JP | 10-148258 | 6/1998 | ................ F16J 3/04 |
| JP | 2000-345961 | 12/2000 | ............. F04B 27/14 |
| JP | 2001-73939 | 3/2001 | ............. F04B 27/14 |
| JP | 2001-132632 | 5/2001 | ............. F04B 27/14 |
| JP | 2003-42062 | 2/2003 | ............. F04B 27/14 |
| JP | 2006-52648 | 2/2006 | ............. F04B 27/14 |
| JP | 2006-307828 | 11/2006 | ............. F04B 27/14 |
| JP | 2007-247512 | 9/2007 | ............. F04B 27/14 |
| JP | 2008-14269 | 1/2008 | ............. F04B 27/14 |
| JP | 2008-202572 | 9/2008 | ............. F04B 27/14 |
| JP | 4242624 | 1/2009 | ............. F04B 49/00 |
| JP | 2011-32916 | 2/2011 | ............. F04B 27/14 |
| JP | 4700048 | 3/2011 | ............. F04B 49/00 |
| JP | 5167121 | 12/2012 | ............. F04B 27/14 |
| JP | 2014-118939 | 6/2014 | ............. F04B 27/14 |
| JP | 5557901 | 6/2014 | ............. F04B 27/14 |
| JP | 2014-190247 | 10/2014 | ............. F04B 27/14 |
| JP | 2016-196876 | 11/2016 | ............. F04B 27/18 |
| JP | 2017-129042 | 7/2017 | ............. F04B 27/18 |
| JP | 6206274 | 10/2017 | ............. F04B 27/18 |
| JP | 2017-223348 | 12/2017 | ............. F16K 11/10 |
| JP | 2018-21646 | 2/2018 | ............. F16K 31/06 |
| JP | 2018-40385 | 3/2018 | ............. F16K 31/06 |
| JP | 2018-145877 | 9/2018 | ............. F04B 39/14 |
| JP | 2019-2384 | 1/2019 | ............. F04B 27/18 |
| WO | WO 2007/119380 | 10/2007 | ............. F04B 27/14 |
| WO | WO2011021789 | 2/2011 | ............. F04B 27/14 |
| WO | WO2011135911 | 11/2011 | ............. F04B 27/14 |
| WO | WO2013109005 | 7/2013 | ............. F04B 49/06 |
| WO | WO2013176012 | 11/2013 | ............. F04B 27/14 |
| WO | WO 2014/091975 | 6/2014 | ............. F04B 27/14 |
| WO | WO 2014/119594 | 8/2014 | ............. F04B 27/14 |
| WO | WO2016104390 | 6/2016 | ............. F16K 31/06 |
| WO | WO 2017/057160 | 4/2017 | ............. F04B 27/18 |
| WO | WO 2017/159553 | 9/2017 | ............. F04B 27/18 |
| WO | WO2018207461 | 11/2018 | ............. F16K 31/06 |
| WO | WO2019146674 | 8/2019 | ............. F04B 27/18 |
| WO | WO2019167912 | 9/2019 | ............. F04B 27/18 |

OTHER PUBLICATIONS

U.S. Appl. No. 17/258,692, filed Jan. 7, 2021, Hayama et al.
U.S. Appl. No. 17/256,947, filed Dec. 29, 2020, Hayama et al.
U.S. Appl. No. 17/256,955, filed Dec. 29, 2020, Hayama et al.
U.S. Appl. No. 17/256,959, filed Dec. 29, 2020, Hayama et al.
U.S. Appl. No. 17/256,953, filed Dec. 29, 2020, Hayama et al.
U.S. Appl. No. 17/056,988, filed Nov. 19, 2020, Kurihara et al.
U.S. Appl. No. 16/969,175, filed Aug. 11, 2020, Kurihara et al.
U.S. Appl. No. 16/967,693, filed Aug. 5, 2020, Hayama et al.
U.S. Appl. No. 16/967,692, filed Aug. 5, 2020, Hayama et al.
U.S. Appl. No. 16/962,786, filed Jul. 16, 2020, Hayama et al.
International Search Report and Written Opinion issued in PCT/JP2019/002207, dated Apr. 23, 2019, with English translation, 13 pages.
International Preliminary Report on Patentability issued in PCT/JP2019/002207, dated Jul. 28, 2020, 7 pages.
International Search Report and Written Opinion issued in PCT/JP2019/005200, dated Apr. 23, 2019, with English translation, 12 pages.
International Preliminary Report on Patentability issued in PCT/JP2019/005200, dated Aug. 18, 2020, 7 pages.
International Search Report and Written Opinion issued in PCT/JP2019/007187, dated Apr. 23, 2019, with English translation, 16 pages.
International Preliminary Report on Patentability issued in PCT/JP2019/007187, dated Sep. 3, 2020, 8 pages.
International Search Report and Written Opinion issued in PCT/JP2019/020196, dated Aug. 27, 2019, with English translation, 11 pages.
International Preliminary Report on Patentability issued in PCT/JP2019/020196, dated Nov. 24, 2020, with English translation, 6 pages.

(56) References Cited

OTHER PUBLICATIONS

International Search Report and Written Opinion issued in PCT/JP2019/005199, dated Apr. 23, 2019, with English translation, 12 pages.
International Preliminary Report on Patentability issued in PCT/JP2019/005199, dated Aug. 18, 2020, 4 pages.
International Search Report and Written Opinion issued in PCT/JP2019/027112, dated Oct. 15, 2019, with English translation, 10 pages.
International Preliminary Report on Patentability issued in PCT/JP2019/027112, dated Jan. 19, 2021, 4 pages.
International Search Report and Written Opinion issued in PCT/JP2019/027071, dated Oct. 15, 2019, with English translation, 12 pages.
International Preliminary Report on Patentability issued in PCT/JP2019/027071, dated Jan. 12, 2021, 4 pages.
International Search Report and Written Opinion issued in PCT/JP2019/027072, dated Oct. 8, 2019, with English translation, 10 pages.
International Preliminary Report on Patentability issued in PCT/JP2019/027072, dated Jan. 12, 2021, 4 pages.
International Search Report and Written Opinion issued in PCT/JP2019/027073, dated Oct. 15, 2019, with English translation, 10 pages.
International Preliminary Report on Patentability issued in PCT/JP2019/027073, dated Jan. 12, 2021, 4 pages.
International Search Report and Written Opinion issued in PCT/JP2019/031067, dated Oct. 15, 2019, with English translation, 18 pages.
International Preliminary Report on Patentability issued in PCT/JP2019/031067, dated Feb. 9, 2021, 6 pages.
International Search Report and Written Opinion issued in PCT/JP2019/031068, dated Oct. 15, 2019, with English translation, 13 pages.
International Preliminary Report on Patentability issued in PCT/JP2019/031068, dated Feb. 9, 2021, 5 pages.
International Search Report and Written Opinion issued in PCT/JP2019/031069, dated Oct. 15, 2019, with English translation, 12 pages.
International Preliminary Report on Patentability issued in PCT/JP2019/031069, dated Feb. 9, 2021, 4 pages.
Chinese Official Action issued in related application serial No. 202080016397.7, dated Aug. 3, 2022, with translation, 10 pages.
Chinese Official Action issued in related application serial No. 202080007416.X, dated Jul. 28, 2022, with translation, 9 pages.
European Official Action issued in related application serial No. 20782597.7, dated Oct. 19, 2022, 5 pages.
U.S. Official Action issued in related U.S. Appl. No. 17/256,955, dated Aug. 23, 2022, 17 pages.
U.S. Notice of Allowance issued in related U.S. Appl. No. 17/256,959, dated Sep. 7, 2022, 13 pages.
www.lexico.com/en/definition/connected accessed Aug. 15, 2022 , Year 2022.
U.S. Official Action issued in related U.S. Appl. No. 17/299,285, dated Mar. 31, 2022, 11 pages.
Chinese Official Action issued in related application serial No. 201980044409.4, dated Jan. 26, 2022, with translation, 10 pages.
Chinese Official Action issued in related application serial No. 201980044138.2, dated Mar. 30, 2022, with translation, 9 pages.
Chinese Official Action issued in related application serial No. 201980044077.x, dated Apr. 2, 2022, with translation, 11 pages.
Chinese Official Action issued in related application serial No. 201980046798.4, dated Apr. 6, 2022, with translation, 8 pages.
Chinese Official Action issued in related application serial No. 201980046750.3, dated Apr. 27, 2022, with translation, 10 pages.
Chinese Official Action issued in related application serial No. 201980047614.6, dated Apr. 26, 2022, with translation, 9 pages.
European Search Report issued in related application serial No. 19848099.8, dated Feb. 9, 2022, 7 pages.
European Search Report issued in related application serial No. 19834984.7, dated Feb. 21, 2022, 12 pages.
European Search Report issued in related application serial No. 19833331.2, dated Mar. 30, 2022, 6 pages.
European Search Report issued in related application serial No. 19847690.5, dated Feb. 9, 2022, 5 pages.
European Search Report issued in related application serial No. 19847395.1, dated Feb. 9, 2022, 5 pages.
European Search Report issued in related application serial No. 19834556.3, dated Feb. 17, 2022, 7 pages.
European Search Report issued in related application serial No. 19833028.4, dated Apr. 7, 2022, 8 pages.
European Search Report issued in related application serial No. 19894059.5, dated Jun. 7, 2022, 4 pages.
European Search Report issued in related application serial No. 19883193.5, dated May 23, 2022, 5 pages.
U.S. Official Action issued in related U.S. Appl. No. 17/256,953, dated Apr. 15, 2022, 18 pages.
U.S. Official Action issued in related U.S. Appl. No. 17/259,138, dated Mar. 31, 2022, 5 pages.
U.S. Official Action issued in related U.S. Appl. No. 17/256,95S, dated Feb. 18, 2022, 19 pages.
U.S. Official Action issued in related U.S. Appl. No. 17/259,138, dated Jan. 19, 2022, 6 pages.
U.S. Official Action issued in related U.S. Appl. No. 17/256,959, dated May 5, 2022, 18 pages.
U.S. Official Action issued in related U.S. Appl. No. 17/433,558, dated May 25, 2022, 11 pages.
International Search Report and Written Opinion issued in PCT/JP2021/015598, dated Jun. 15, 2021, with English translation, 13 pages.
International Preliminary Report on Patentability issued in PCT/JP2020/015598, dated Oct. 25, 2022, 5 pages.
Chinese Official Action issued in related application serial No. 202080026878.6, dated Oct. 9, 2022, with translation, 9 pages.
Chinese Official Action issued in related application serial No. 201980046750.3, dated Nov. 3, 2022, with translation, 11 pages.
European Official Action issued in related application serial No. 20744724.4, dated Sep. 16, 2022, 8 pages.
European Official Action issued in related application serial No. 20765478.1, dated Nov. 3, 2022, 7 pages.
European Official Action issued in related application serial No. 20783639.6, dated Nov. 22, 2022, 8 pages.
International Search Report and Written Opinion issued in PCT/JP2019/043374, dated Jan. 7, 2020, with English translation, 10 pages.
International Preliminary Report on Patentability issued in PCT/JP2019/043374, dated May 11, 2021, 4 pages.
International Search Report and Written Opinion issued in PCT/JP2019/047192, dated Jun. 11, 2020, with English translation, 15 pages.
International Preliminary Report on Patentability issued in PCT/JP2019/047192, dated Jun. 8, 2021, 4 pages.
International Search Report and Written Opinion issued in PCT/JP2020/001443, dated Mar. 31, 2020, with English translation, 15 pages.
International Preliminary Report on Patentability issued in PCT/JP2020/001443, dated Jul. 29, 2021, 8 pages.
International Search Report and Written Opinion issued in PCT/JP2020/007953, dated Apr. 7, 2020, with English translation, 17 pages.
International Preliminary Report on Patentability issued in PCT/JP2020/007953, dated Sep. 16, 2021, 10 pages.
International Search Report and Written Opinion issued in PCT/JP2020/015181, dated Jun. 16, 2020, with English translation, 11 pages.
International Preliminary Report on Patentability issued in PCT/JP2020/015181, dated Oct. 14, 2021, 5 pages.
International Search Report and Written Opinion issued in PCT/JP2020/015175, dated Jun. 23, 2020, with English translation, 13 pages.
International Preliminary Report on Patentability issued in PCT/JP2020/015175, dated Oct. 14, 2021, 6 pages.

(56) References Cited

OTHER PUBLICATIONS

U.S. Official Action issued in related U.S. Appl. No. 17/259,138, dated Jan. 18, 2022, 14 pages.
Notice of Allowance issued in related U.S. Appl. No. 17/287,086, dated Feb. 2, 2022, 7 pages.
Chinese Official Action issued in related application serial No. 201980046798.4, dated Dec. 5, 2022, with translation, 13 pages.
Chinese Official Action issued in related application serial No. 201980046750.3, dated Mar. 1, 2023, with translation, 12 pages.
Chinese Official Action issued in related application serial No. 202080026386.7, dated Oct. 31, 2022, with translation, 8 pages.
European Official Action issued in related application serial No. 19847690.5, dated Jul. 10, 2023, 4 pages.
U.S. Official Action issued in related U.S. Appl. No. 17/599,539, dated Apr. 25, 2023, 6 pages.
U.S. Official Action issued in related U.S. Appl. No. 17/417,701, dated Aug. 2, 2023, 11 pages.
U.S. Official Action issued in related U.S. Appl. No. 17/258,692, dated Aug. 3, 2023, 8 pages.
U.S. Official Action issued in related U.S. Appl. No. 17/600,547, dated Sep. 13, 2023, 13 pages.
Notice of Allowance issued in related U.S. Appl. No. 17/599,539, dated Jul. 25, 2023, 4 pages.
Notice of Allowance issued in related U.S. Appl. No. 17/258,692, dated Sep. 27, 2023, 5 pages.
U.S. Appl. No. 17/256,953, filed Dec. 29, 2020.
U.S. Appl. No. 17/299,285, filed Jun. 2, 2021.
U.S. Appl. No. 17/256,959, filed Dec. 29, 2020.
U.S. Appl. No. 17/287,086, filed Apr. 20, 2021.
U.S. Appl. No. 17/417,701, filed Jun. 23, 2021.
U.S. Appl. No. 17/258,692, filed Jan. 7, 2021.
U.S. Appl. No. 17/256,955, filed Dec. 29, 2020.
U.S. Appl. No. 17/433,558, filed Aug. 24, 2021.
U.S. Appl. No. 17/256,947, filed Dec. 29, 2020.
U.S. Appl. No. 17/258,708, filed Jan. 7, 2021.
U.S. Appl. No. 17/259,138, filed Jan. 8, 2021.
U.S. Appl. No. 17/600,547, filed Sep. 30, 2021.
U.S. Appl. No. 17/599,539, filed Sep. 28, 2021.
Korean Official Action issued in related application serial No. 10-2021-7019897, dated Oct. 21, 2023, 10 pages.
U.S. Official Action issued in related U.S. Appl. No. 17/417,701, dated Nov. 9, 2023, 14 pages.
U.S. Official Action issued in related U.S. Appl. No. 17/256,947, dated Nov. 20, 2023, 10 pages.
Notice of Allowance issued in related U.S. Appl. No. 17/600,547, dated Nov. 28, 2023, 6 pages.

| ENERGIZATION STATE | CURRENT | CS VALVE | DC VALVE |
|---|---|---|---|
| NON-ENERGIZATION | 0 | CLOSED | CLOSED |
| ENERGIZATION | 0 ~ MAX | OPENING DEGREE INCREASED | CONTINUOUSLY OPENED AFTER OPENING DEGREE INCREASE FOR PREDETERMINED PERIOD AFTER CLOSING FOR PREDETERMINED PERIOD |
| | MAX | OPENED | OPENED |

Fig. 8

CAPACITY CONTROL VALVE

TECHNICAL FIELD

The present invention relates to a capacity control valve configured to variably control a working fluid capacity, and for example, relates to a capacity control valve configured to control, according to a pressure, a discharge amount of a variable displacement compressor used for an air-conditioning system of an automobile.

BACKGROUND ART

A variable displacement compressor used for, e.g., an air-conditioning system of an automobile includes, for example, a rotary shaft to be rotatably driven by an engine, a swash plate coupled such that an inclination angle thereof with respect to the rotary shaft is variable, and a compression piston coupled to the swash plate. The inclination angle of the swash plate is changed, and accordingly, a stroke amount of the piston is changed. In this manner, a fluid discharge amount is controlled. Using a capacity control valve to be openably driven by electromagnetic force, the variable displacement compressor can control the internal pressure of a control chamber as necessary to continuously change the inclination angle of the swash plate while utilizing a suction pressure Ps of a suction chamber for sucking fluid, a discharge pressure Pd of a discharge chamber for discharging fluid pressurized by the piston, and a control pressure Pc of the control chamber housing the swash plate (see Patent Citations 1, 2, and 3).

In continuous drive (hereinafter sometimes merely referred to as "in continuous drive") of the variable displacement compressor, energization of the capacity control valve is controlled by a control computer, and the capacity control valve moves a valve body in an axial direction by electromagnetic force generated by a solenoid to perform the normal control of opening/closing a main valve to adjust the control pressure Pc of the control chamber of the variable displacement compressor.

For example, a capacity control valve of Patent Citation 1 is configured such that a control chamber is connected to a discharge chamber through a stationary orifice, and controls a CS valve as a main valve to adjust the pressure of the control chamber with a suction pressure. Moreover, a capacity control valve of Patent Citation 2 is configured such that a control chamber is connected to a suction chamber through a stationary orifice, and controls a DC valve as a main valve to adjust the pressure of the control chamber with a discharge pressure. Further, a capacity control valve of Patent Citation 3 controls a CS valve and a DC valve to adjust the pressure of a control chamber.

In normal control of the capacity control valve, the pressure of the control chamber in the variable displacement compressor is controlled as necessary, and the inclination angle of the swash plate with respect to the rotary shaft is continuously changed. In this manner, the stroke amount of the piston is changed such that the fluid discharge amount for the discharge chamber is controlled, and the air-conditioning system is adjusted to have a desired cooling capacity. Moreover, in a case where the variable displacement compressor is driven with the maximum capacity, the main valve of the capacity control valve is closed such that the pressure of the control chamber decreases, and in this manner, the inclination angle of the swash plate becomes maximum.

CITATION LIST

Patent Literature

Patent Citation 1: JP 2017-129042 A (Page 9, FIG. 2)
Patent Citation 2: Japanese Patent No. 6206274 (Page 8, FIG. 2)
Patent Citation 3: Japanese Patent No. 4242624 (Page 7, FIG. 1)

SUMMARY OF INVENTION

Technical Problem

However, in Patent Citations 1 and 2, the capacity control valve can be configured with a simple configuration. However, the stationary orifice connected to the control chamber of the variable displacement compressor has a constant flow path sectional area. Thus, for adjusting the pressure of the control chamber only by control of the main valve (the CS valve or the DC valve) in normal control, there is room for improvement in controllability of the control pressure Pc. Moreover, in Patent Citation 3, the CS valve and the DC valve are arranged to enhance controllability. However, Patent Citation 3 fails to describe cooperation of the CS valve and the DC valve, and a favorable control efficiency in normal control cannot be always provided.

The present invention has been made in view of these problems, and is intended to provide a capacity control valve with a favorable control efficiency in normal control.

Solution to Problem

For solving the above-described problems, a capacity control valve according to a first aspect of the present invention is a capacity control valve for controlling a flow rate by energization of a solenoid, the capacity control valve including: a valve housing formed with a discharge port through which discharge fluid with a discharge pressure passes, a suction port through which suction fluid with a suction pressure passes, and first and second control ports through which control fluid with a control pressure passes; a rod movably arranged in the valve housing and driven by the solenoid; a CS valve configured to control a fluid flow between the first control port and the suction port in accordance with a movement of the rod; and a DC valve configured to control a fluid flow between the second control port and the discharge port in accordance with the movement of the rod. In a non-energization state of the solenoid, the CS valve is closed and the DC valve is closed. As the energization of the solenoid becomes larger, the CS valve transitions from a closed state to an open state and the DC valve transitions from a closed state to an open state. In a maximum current state of the solenoid, the CS valve is opened and the DC valve is opened. According to the aforesaid feature of the first aspect, the flow rate is controlled by cooperation of the CS valve and the DC valve, and therefore, the control pressure can be controlled with a favorable efficiency. Moreover, the degree of opening of the valve transitions in the same direction between the CS valve and the DC valve as energization current increases, and the control pressure is controlled based on a difference between the amount of adjustment of the control pressure by the CS valve and the amount of adjustment of the control pressure by the DC valve. Thus, the control pressure can be finely controlled in association with a current value.

It may be preferable that in the energization of the solenoid, the DC valve is brought into the open state behind that of the CS valve. According to this preferable configuration, a control range according to the energization current for the solenoid is broader in the CS valve than in the DC valve. That is, the CS valve is main, and the DC valve is auxiliary. Thus, a favorable control efficiency is provided. Particularly in about an intermediate range of control current, the control pressure can be finely controlled in association with the current value.

I may be preferable that in the energization of the solenoid, the DC valve is be brought into a fully-open state faster than the CS valve. According to this preferable configuration, the control range according to the energization current for the solenoid is broader in the CS valve than in the DC valve. That is, the CS valve is main, and the DC valve is auxiliary. Thus, a favorable control efficiency is provided. Particularly in about the intermediate range of the control current, the control pressure can be finely controlled in association with the current value.

It may be preferable that the DC valve includes a DC valve body slidably attached to the rod and a DC valve seat provided at the valve housing. According to this preferable configuration, the DC valve can be simply configured.

It may be preferable that the DC valve body is biased toward a side of the DC valve seat by a spring. According to this preferable configuration, the closed state can be reliably held upon closing of the DC valve.

It may be preferable that a flange portion extending in a radially outward direction and configured to restrict a movement of the DC valve body in a closing direction is formed at the rod. According to this preferable configuration, the DC valve body moves in an opening direction in association with movement of the rod in an opening direction, and therefore, the DC valve can be reliably held in the open state in the energization control of the solenoid.

It may be preferable that the flange portion is a ring which is formed as a body different from the rod. According to this preferable configuration, the flange portion can be simply configured.

It may be preferable that the DC valve body is arranged between the outer periphery of the rod and the inner periphery of the housing to partition the suction port and the discharge port. According to this preferable configuration, the capacity control valve can be simply configured.

It may be preferable that the CS valve includes a CS valve seat provided at the valve housing and a pressure-sensitive body arranged in a pressure-sensitive chamber formed with the first control port so as to bias the rod. According to this preferable configuration, a structure in which reactive force provided to the rod according to the suction pressure is increased/decreased is made, and controllability of the control pressure is enhanced.

It may be preferable that a spring configured to provide a biasing force in an axial direction is arranged between the pressure-sensitive body and the rod. According to this preferable configuration, the spring can deformably move in the axial direction. Thus, even if an axial deformable amount of the pressure-sensitive body is small, the DC valve can be reliably operated.

It may be preferable that the second control port, the discharge port, the suction port, and the first control port may be arranged in description order from a side of the solenoid. According to this preferable configuration, the valve housing can be simply configured.

A capacity control valve according to a second aspect of the present invention is a capacity control valve for controlling a flow rate by energization of a solenoid, the capacity control valve including: a valve housing formed with a discharge port through which discharge fluid with a discharge pressure passes, a suction port through which suction fluid with a suction pressure passes, and first and second control ports through which control fluid with a control pressure passes; a rod movably arranged in the valve housing and driven by the solenoid; a DC valve body partially forming a DC valve arranged at the outer periphery of the rod to control a fluid flow between the second control port and the discharge port; a spring configured to bias the DC valve body toward a side of the solenoid; and a pressure-sensitive body partially forming a CS valve configured to control a fluid flow between the first control port and the suction port in accordance with a movement of the rod. According to the aforesaid feature of the second aspect, the flow rate is controlled by cooperation of the CS valve and the DC valve, and therefore, the control pressure can be efficiently controlled.

BRIEF DESCRIPTION OF DRAWINGS

FIG. 8 is a table for describing the energization state of the capacity control valve of the embodiment and the opened/closed states of the CS valve and the DC valve.

DESCRIPTION OF EMBODIMENTS

Hereinafter, a mode for carrying out a capacity control valve according to the present invention will be described based on an embodiment.

Embodiment

A capacity control valve according to an embodiment will be described with reference to FIGS. 1 to 8. Hereinafter, right and left sides as viewed from a front side of FIG. 2 will be described as right and left sides of the capacity control valve.

The capacity control valve V of the present invention is incorporated into a variable displacement compressor M used for, e.g., an air-conditioning system of an automobile. The capacity control valve V variably controls the pressure of working fluid (hereinafter merely referred to as "fluid") as refrigerant, thereby controlling a discharge amount of the variable displacement compressor M and adjusting the air-conditioning system to have a desired cooling capacity.

Figure 1:
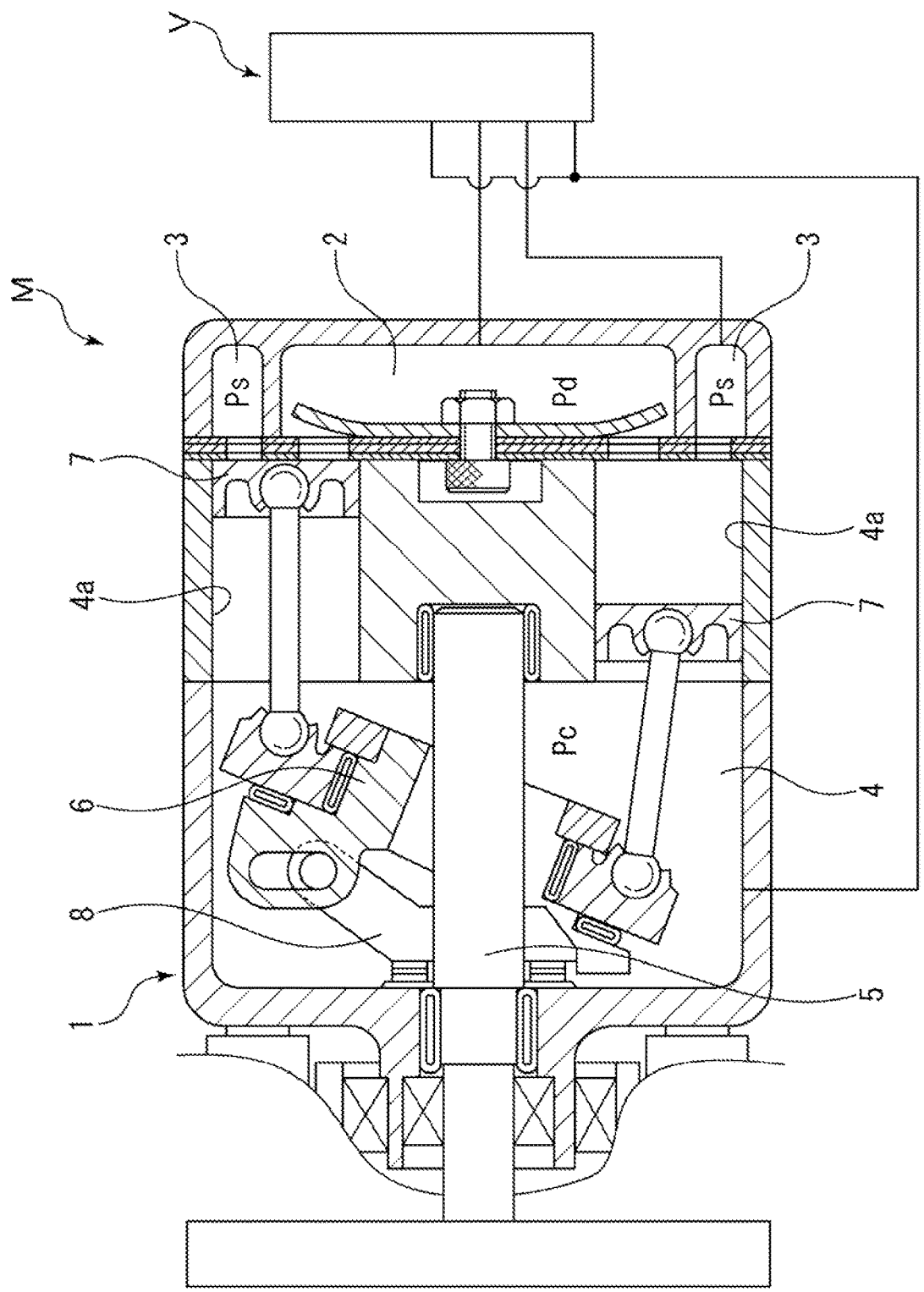
FIG. 1 is a schematic configuration view illustrating a swash plate type variable displacement compressor incorporating a capacity control valve of an embodiment according to the present invention.

First, the variable displacement compressor M will be described. As illustrated in FIG. 1, the variable displacement compressor M has a casing 1 including a discharge chamber 2, a suction chamber 3, a control chamber 4, and multiple cylinders 4a.

Moreover, the variable displacement compressor M includes a rotary shaft 5 to be rotatably driven by a not-shown engine placed outside the casing 1, a swash plate 6 coupled in an eccentric state with respect to the rotary shaft 5 by a hinge mechanism 8 in the control chamber 4, and multiple pistons 7 coupled to the swash plate 6 and each reciprocatably fitted in the cylinders 4a. Using the capacity control valve V to be openably driven by electromagnetic force, the variable displacement compressor M controls the internal pressure of the control chamber 4 as necessary to continuously change an inclination angle of the swash plate 6 while utilizing a suction pressure Ps of the suction chamber 3 for sucking the fluid, a discharge pressure Pd of the discharge chamber 2 for discharging the fluid pressurized by the piston 7, and a control pressure Pc of the control chamber 4 housing the swash plate 6. In this manner, the variable displacement compressor M changes a stroke amount of the piston 7 to control the fluid discharge amount. Note that for the sake of convenience in description, the capacity control valve V incorporated into the variable displacement compressor M is not shown in FIG. 1.

Specifically, as the control pressure Pc in the control chamber 4 increases, the inclination angle of the swash plate 6 with respect to the rotary shaft 5 decreases and the stroke amount of the piston 7 decreases. However, when such a pressure reaches a pressure of equal to or higher than a certain pressure, the swash plate 6 is brought into a state in which the swash plate 6 is substantially perpendicular to the rotary shaft 5, i.e., a state in which the swash plate 6 is slightly inclined with respect to a direction perpendicular to the rotary shaft 5. In this state, the stroke amount of the piston 7 is minimum, and pressurization of the fluid in the cylinder 4a by the piston 7 is minimum. Accordingly, the amount of fluid discharged to the discharge chamber 2 decreases, and the cooling capacity of the air-conditioning system becomes minimum. On the other hand, as the control pressure Pc in the control chamber 4 decreases, the inclination angle of the swash plate 6 with respect to the rotary shaft 5 increases and the stroke amount of the piston 7 increases. However, when such a pressure reaches a pressure of equal to or lower than a certain pressure, the swash plate 6 is at the maximum inclination angle with respect to the rotary shaft 5. In this state, the stroke amount of the piston 7 is maximum, and pressurization of the fluid in the cylinder 4a by the piston 7 is maximum. Accordingly, the amount of fluid discharged to the discharge chamber 2 increases, and the cooling capacity of the air-conditioning system becomes maximum.

Figure 2:
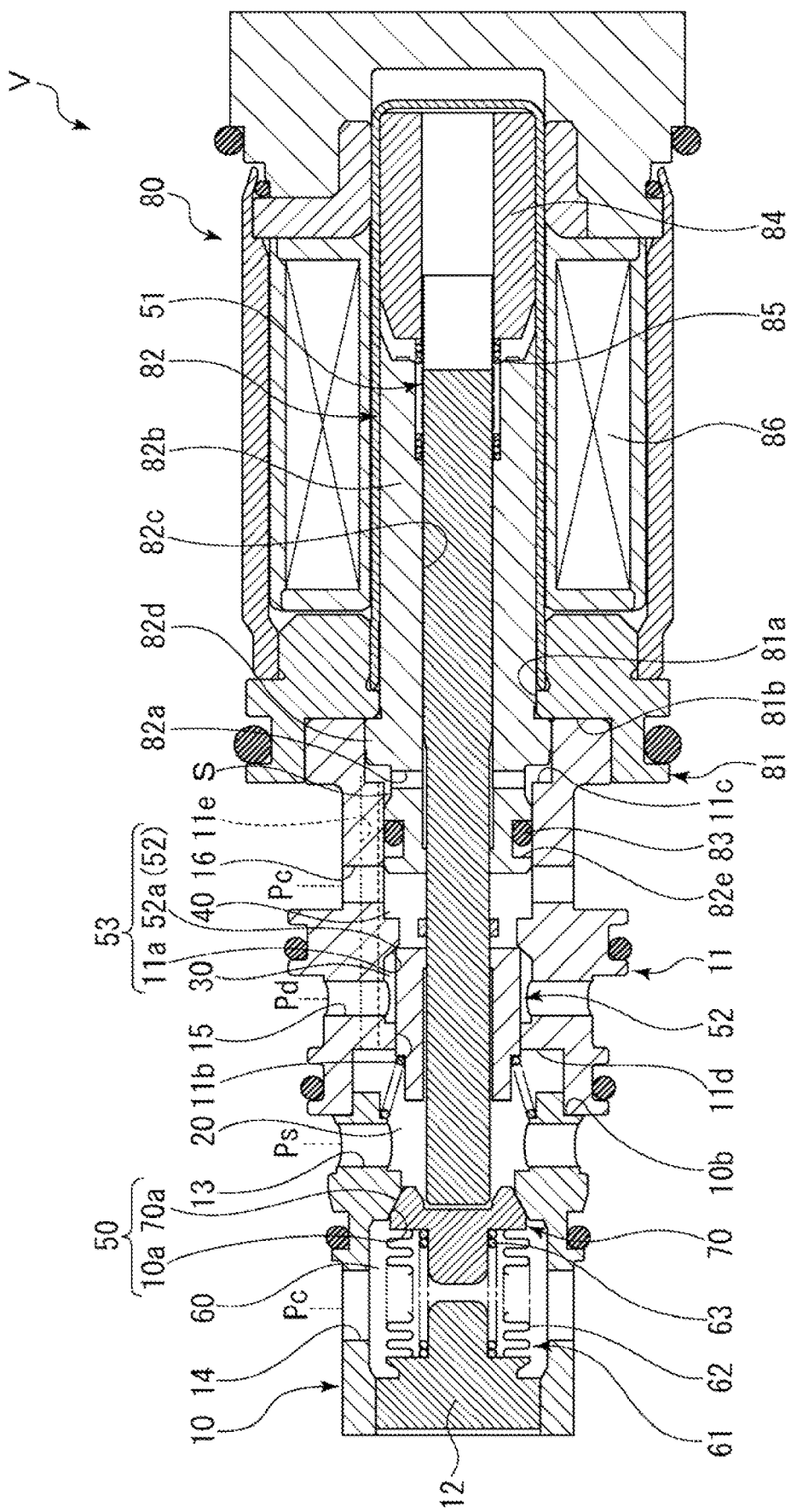
FIG. 2 is a sectional view illustrating a state in which a DC valve is closed and a CS valve is closed in a non-energization state of the capacity control valve of the embodiment.

As illustrated in FIG. 2, the capacity control valve V incorporated into the variable displacement compressor M adjusts current energizing a coil 86 forming a solenoid 80, controls opening/closing of a CS valve 50 and a DC valve 53 in the capacity control valve V, and controls the fluid flowing into the control chamber 4 or flowing out of the control chamber 4. In this manner, the capacity control valve V variably controls the control pressure Pc in the control chamber 4. Note that upon normal control of the capacity control valve V, the discharge pressure Pd is a higher pressure than the control pressure Pc, and the control pressure Pc is a high pressure of equal to or higher than the suction pressure Ps.

In the present embodiment, the CS valve 50 includes an adaptor 70 forming a pressure-sensitive body 61, and a CS valve seat 10a formed at an inner peripheral surface of a first valve housing 10 as a valve housing. A tapered end portion 70a formed on the right side of the adaptor 70 in an axial direction contacts or separates from the CS valve seat 10a, and in this manner, the CS valve 50 is opened/closed. The DC valve 53 includes a DC valve body 52 and a DC valve seat 11a formed at an inner peripheral surface of a second valve housing 11 as the valve housing. A right end 52a of the DC valve body 52 in the axial direction contacts or separates from the DC valve seat 11a, and in this manner, the DC valve 53 is opened/closed.

Subsequently, the structure of the capacity control valve V will be described. As illustrated in FIG. 2, the capacity control valve V mainly includes the first valve housing 10 and the second valve housing 11 made of a metal material or a resin material, a rod 51 and the DC valve body 52 arranged reciprocatably in the axial direction inside the first valve housing 10 and the second valve housing 11, the pressure-sensitive body 61 configured to provide rightward biasing force in the axial direction to the rod 51 according to the suction pressure Ps in a first valve chamber 20, and the solenoid 80 connected to the second valve housing 11 and providing drive force to the rod 51. The DC valve body 52 is fitted onto the rod 51, and is provided reciprocatably in the axial direction relative to the rod 51.

As illustrated in FIG. 2, the solenoid 80 mainly includes a casing 81 having an opening 81a opening leftward in the axial direction, a substantially cylindrical stationary iron core 82 inserted into the opening 81a of the casing 81 from the left in the axial direction and fixed to an inner diameter side of the casing 81, the rod 51 inserted into the stationary iron core 82 and arranged reciprocatably in the axial direction, a movable iron core 84 fixed to a right end portion of the rod 51 in the axial direction, a coil spring 85 provided between the stationary iron core 82 and the movable iron core 84 and biasing the movable iron core 84 rightward in the axial direction, and the excitation coil 86 wound around the outside of the stationary iron core 82 through a bobbin.

At the casing 81, a recessed portion 81b recessed rightward in the axial direction on the inner diameter side at a left end in the axial direction is formed. A right end portion of the second valve housing 11 in the axial direction is substantially hermetically inserted/fixed into the recessed portion 81b.

The stationary iron core 82 is made of a rigid body as a magnetic material such as iron or silicon steel, and includes a cylindrical portion 82b extending in the axial direction and formed with an insertion hole 82c into which a right portion of the rod 51 in the axial direction is inserted and an annular flange portion 82d extending in an outer diameter direction from an outer peripheral surface of a left end portion of the cylindrical portion 82b in the axial direction. On the left side in the axial direction with respect to the flange portion 82d, an annular recessed portion 82e recessed in an inner diameter direction from an outer peripheral surface of the cylindrical portion 82b is formed. Note that an O-ring 83 is attached to the annular recessed portion 82e, and therefore, the stationary iron core 82 and the second valve housing 11 are connected and fixed to each other in a hermetic state.

Moreover, in a state in which a right end surface of the flange portion 82d in the axial direction contacts a bottom surface of the recessed portion 81b of the casing 81, the stationary iron core 82 is inserted/fixed into a recessed portion 11c recessed leftward in the axial direction on the inner diameter side at a right end, which is inserted/fixed into the recessed portion 81b of the casing 81, of the second valve housing 11 in the axial direction.

Further, in a state in which the stationary iron core 82 and the second valve housing 11 are attached to the casing 81, an annular space S is formed between a left end surface of the flange portion 82d of the stationary iron core 82 in the axial direction and the recessed portion 11c of the second valve housing 11. Note that the space S is communicated with the insertion hole 82c inside the stationary iron core 82 through a through-hole 82a extending in a radial direction between the flange portion 82d and the annular recessed portion 82e at the cylindrical portion 82b of the stationary iron core 82.

As illustrated in FIG. 2, a Ps port 13 as a suction port communicated with the suction chamber 3 of the variable displacement compressor M and a first Pc port 14 as a first control port communicated with the control chamber 4 of the variable displacement compressor M are formed at the first valve housing 10. Moreover, a Pd port 15 as a discharge port communicated with the discharge chamber 2 of the variable displacement compressor M and a second Pc port 16 as a second control port communicated with the control chamber 4 of the variable displacement compressor M are formed at the second valve housing 11. Note that these ports are, from a solenoid 80 side, formed in the order of the second Pc port 16, the Pd port 15, the Ps port 13, and the first Pc port 14.

Moreover, an outer diameter portion at a right end of the first valve housing 10 in the axial direction is recessed leftward in the axial direction to form a step portion 10b, and a left end portion of the second valve housing 11 in the axial direction is fitted onto such an outer diameter portion from the right in the axial direction such that the first valve housing 10 is connected and fixed in a hermetic state. Further, a partition adjustment member 12 is substantially hermetically press-fitted in a left end portion of the first valve housing 10 in the axial direction, and therefore, the first valve housing 10 is in a substantially cylindrical shape with a bottom. Note that the partition adjustment member 12 adjusts an installation position of the first valve housing 10 in the axial direction so that the biasing force of the pressure-sensitive body 61 can be adjusted.

The rod 51 and the DC valve body 52 are arranged reciprocatably in the axial direction in the first valve housing 10 and the second valve housing 11, and at part of the inner peripheral surface of the second valve housing 11, a small-diameter guide surface 11b is formed so that an outer peripheral surface of a first cylindrical portion 52b (see FIGS. 3 to 6) of the DC valve body 52 can slidably contact the guide surface 11b in a substantially hermetic state.

Moreover, in the first valve housing 10, the first valve chamber 20 which is communicated with the Ps port 13 and in which a left end portion of the rod 51 in the axial direction is arranged and a pressure-sensitive chamber 60 which is communicated with the first Pc port 14 and in which the pressure-sensitive body 61 is arranged are formed. Further, in the second valve housing 11, a second valve chamber 30 which is communicated with the Pd port 15 and in which a second cylindrical portion 52c (see FIGS. 3 to 6) of the DC valve body 52 is arranged and a third valve chamber 40 which is communicated with the second Pc port 16 and is arranged on the solenoid 80 side of the second valve housing 11 are formed.

Note that the first valve chamber 20 is defined by outer peripheral surfaces at left end portions of the rod 51 and the DC valve body 52 in the axial direction, an inner peripheral surface on the right side in the axial direction with respect to the CS valve seat 10a of the first valve housing 10, and an inner surface of a recessed portion 11d recessed rightward in the axial direction on the inner diameter side at a left end of the second valve housing 11 in the axial direction. Further, in a state in which the first valve housing 10 and the second valve housing 11 are connected and fixed to each other, the first valve chamber 20 and the second valve chamber 30 are partitioned by the first cylindrical portion 52b of the DC valve body 52. Moreover, the second valve chamber 30 and the third valve chamber 40 are defined by an outer peripheral surface of the DC valve body 52 and the inner peripheral surface of the second valve housing 11. When the DC valve 53 is closed, the second valve chamber 30 and the third valve chamber 40 are separated from each other. When the DC valve 53 is opened, the second valve chamber 30 and the third valve chamber 40 are communicated with each other.

Further, a through-hole 11e extending in the axial direction from the recessed portion 11c on the right side in the axial direction to the recessed portion 11d on the left side in the axial direction is formed at the second valve housing 11, and the first valve chamber 20 and the space S are communicated with each other through the through-hole 11e. Thus, the suction pressure Ps of the suction chamber 3 is introduced into the right side in the axial direction as the back side of the movable iron core 84 forming the solenoid 80 through the Ps port 13, the first valve chamber 20, the through-hole 11e of the second valve housing 11, the space S, and the through-hole 82a and the insertion hole 82c of the stationary iron core 82, and accordingly, pressure on both sides of the rod 51 in the axial direction is balanced.

As illustrated in FIG. 2, the pressure-sensitive body 61 mainly includes a bellows core 62 having a built-in coil spring 63, and the adaptor 70 provided at a right end of the bellows core 62 in the axial direction. A left end of the bellows core 62 in the axial direction is fixed to the partition adjustment member 12.

Moreover, the pressure-sensitive body 61 is arranged in the pressure-sensitive chamber 60, and by the biasing force of moving the adaptor 70 rightward in the axial direction by the coil spring 63 and the bellows core 62, the tapered end portion 70a of the adaptor 70 sits on the CS valve seat 10a of the first valve housing 10.

As illustrated in FIGS. 3 to 6, the rod 51 includes a large-diameter portion 51a fixed to the movable iron core 84 (see FIG. 2) at a right end portion in the axial direction, and a small-diameter portion 51b formed with a smaller diameter than that of the large-diameter portion 51a on the left side of the large-diameter portion 51a in the axial direction. Note that a ring 55 as another body is fixed to a left end portion of the small-diameter portion 51b in the axial direction, i.e., the right side in the axial direction with respect to the DC valve body 52, in a state in which the ring 55 is fitted onto such a left end portion.

Moreover, a left end 51c of the rod 51 in the axial direction, i.e., the left end 51c of the small-diameter portion 51b in the axial direction, can contact a bottom surface of a recessed portion 70b recessed leftward in the axial direction on the inner diameter side at a right end of the adaptor 70, which forms the pressure-sensitive body 61, in the axial direction. Specifically, the left end 51c of the rod 51 in the axial direction is separated (see FIGS. 2 and 3) from the bottom surface of the recessed portion 70b of the adaptor 70 in a non-energization state of the capacity control valve V, and contacts (see FIGS. 4 to 6) in an energization state of the capacity control valve V. Accordingly, the leftward drive force of the solenoid 80 in the axial direction acts on the pressure-sensitive body 61, and rightward reactive force in the axial direction is received from the pressure-sensitive body 61.

Subsequently, the DC valve body 52 will be described. As illustrated in FIGS. 3 to 6, the DC valve body 52 is formed in a stepped cylindrical shape having the first cylindrical portion 52b arranged in the second valve chamber 30 and the third valve chamber 40, formed with the right end 52a on the right side in the axial direction, and slidably contacting the guide surface 11b of the second valve housing 11 in a substantially hermetic state at the outer peripheral surface on the left side in the axial direction and the second cylindrical portion 52c formed with a smaller diameter than that of the first cylindrical portion 52b on the left side in the axial direction with respect to the first cylindrical portion 52b. The DC valve body 52 is fitted onto the small-diameter portion 51b of the rod 51. Note that an inner peripheral surface of the DC valve body 52 and an outer peripheral surface of the small-diameter portion 51b of the rod 51 are separated from each other in the radial direction to form a clearance therebetween, and the DC valve body 52 is smoothly slidable in the axial direction relative to the rod 51.

Moreover, a right end portion of a coil spring 54 as a compression spring in the axial direction is, from the left side in the axial direction, fitted onto the second cylindrical portion 52c of the DC valve body 52. Note that the coil spring 54 is set to have a smaller shrinkage allowance than those of the coil spring 85 of the solenoid 80 and the coil spring 63 of the pressure-sensitive body 61.

Further, a left end of the coil spring 54 in the axial direction contacts a bottom surface of a recessed portion 10c recessed rightward in the axial direction on the inner diameter side at the right end of the first valve housing 10 in the axial direction, and a right end of the coil spring 54 in the axial direction contacts a left side portion 52d of the first cylindrical portion 52b of the DC valve body 52 in the axial direction. That is, the DC valve body 52 is biased rightward in the axial direction by the coil spring 54. When the DC valve 53 is opened, the DC valve body 52 is brought into a state in which a left end 52f of the DC valve body 52 in the axial direction is pressed against a right end surface of the ring 55 in the axial direction (see FIGS. 5 and 6), and together with the rod 51, moves rightward in the axial direction, i.e., an opening direction. When the DC valve 53 is closed, the DC valve body 52 is brought into a state in which the right end 52a of the DC valve body 52 in the axial direction is pressed against the DC valve seat 11a of the second valve housing 11 (see FIGS. 3 and 4), and can reliably hold a closed state of the DC valve 53. Further, the rod 51 is movable rightward in the axial direction relative to the DC valve body 52 after closing of the DC valve 53.

Figure 4:
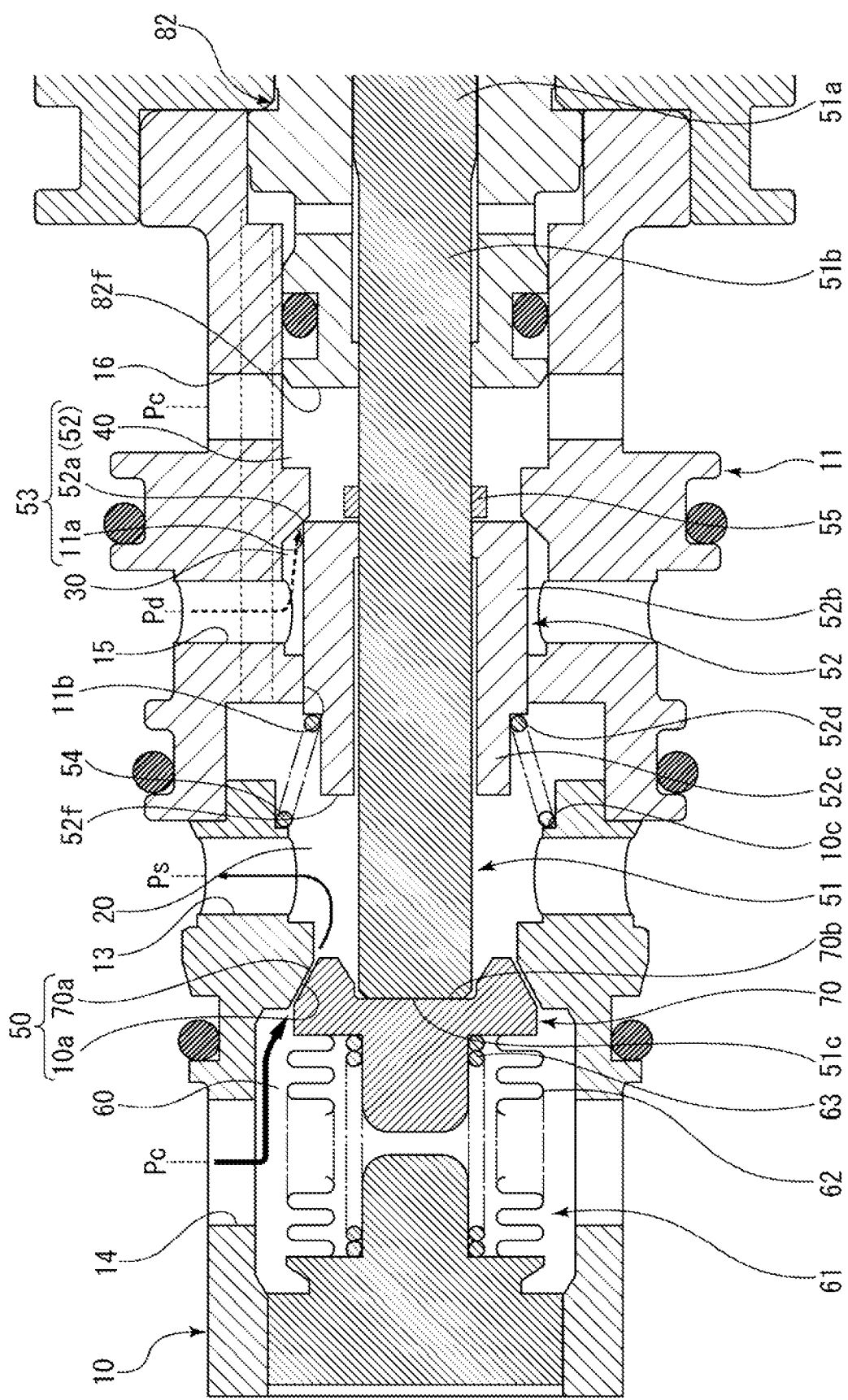
FIG. 4 is a sectional view illustrating a state in which the DC valve is closed and the CS valve is opened in an energization state (in normal control) of the capacity control valve of the embodiment.
Figure 7:
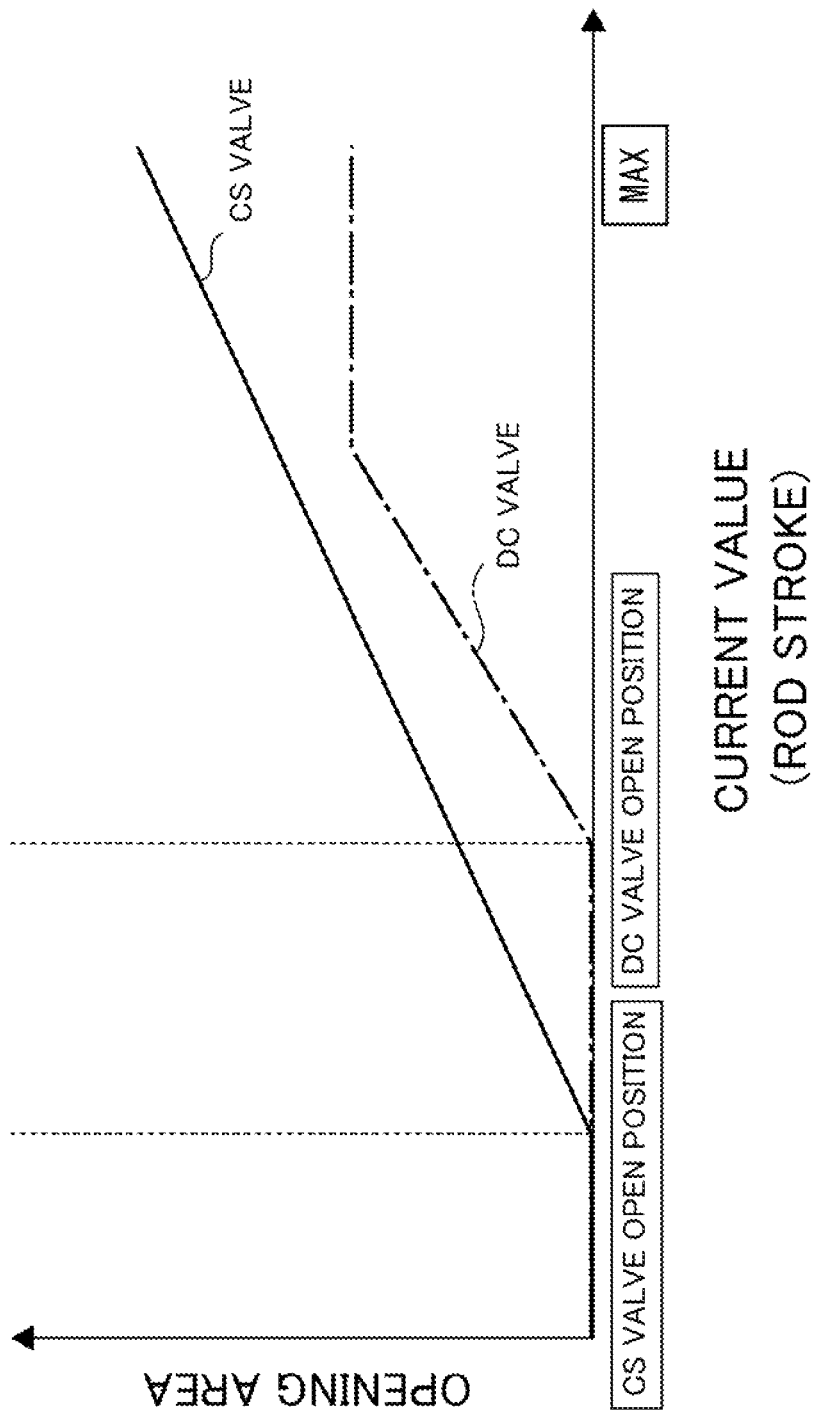
FIG. 7 is a view for describing the opened/closed state of the DC valve and the opened/closed state of the CS valve in association with energization current (corresponding to a rod stroke) in the capacity control valve of the embodiment. Note that the energization current (corresponding to the stroke) of the horizontal axis is shown in terms of the direction (i.e., a direction from the left to the right in FIG. 2) of moving a rod upon current application to a solenoid.

In addition, as illustrated in FIGS. 4 and 7, when the rod 51 moves leftward in the axial direction in the energization state of the capacity control valve V, the left end 51c of the rod 51 in the axial direction contacts the bottom surface of the recessed portion 70b of the adaptor 70, and the leftward drive force of the solenoid 80 in the axial direction acts on the pressure-sensitive body 61 to increase the degree of opening as an opening area of the CS valve 50. In this state, a position in the axial direction is adjusted such that a left end surface of the ring 55, which is fixed to the rod 51, in the axial direction is separated from the right end 52a of the DC valve body 52 in the axial direction. Thereafter, when the rod 51 further moves leftward in the axial direction, the CS valve 50 is opened to a predetermined valve opening degree, and the left end surface of the ring 55 in the axial direction contacts the right end 52a of the DC valve body 52 in the axial direction.

Subsequently, operation of the capacity control valve V and operation of opening/closing mechanisms of the CS valve 50 and the DC valve 53 by movement of the rod 51 and the DC valve body 52 in the axial direction will be described.

Figure 3:
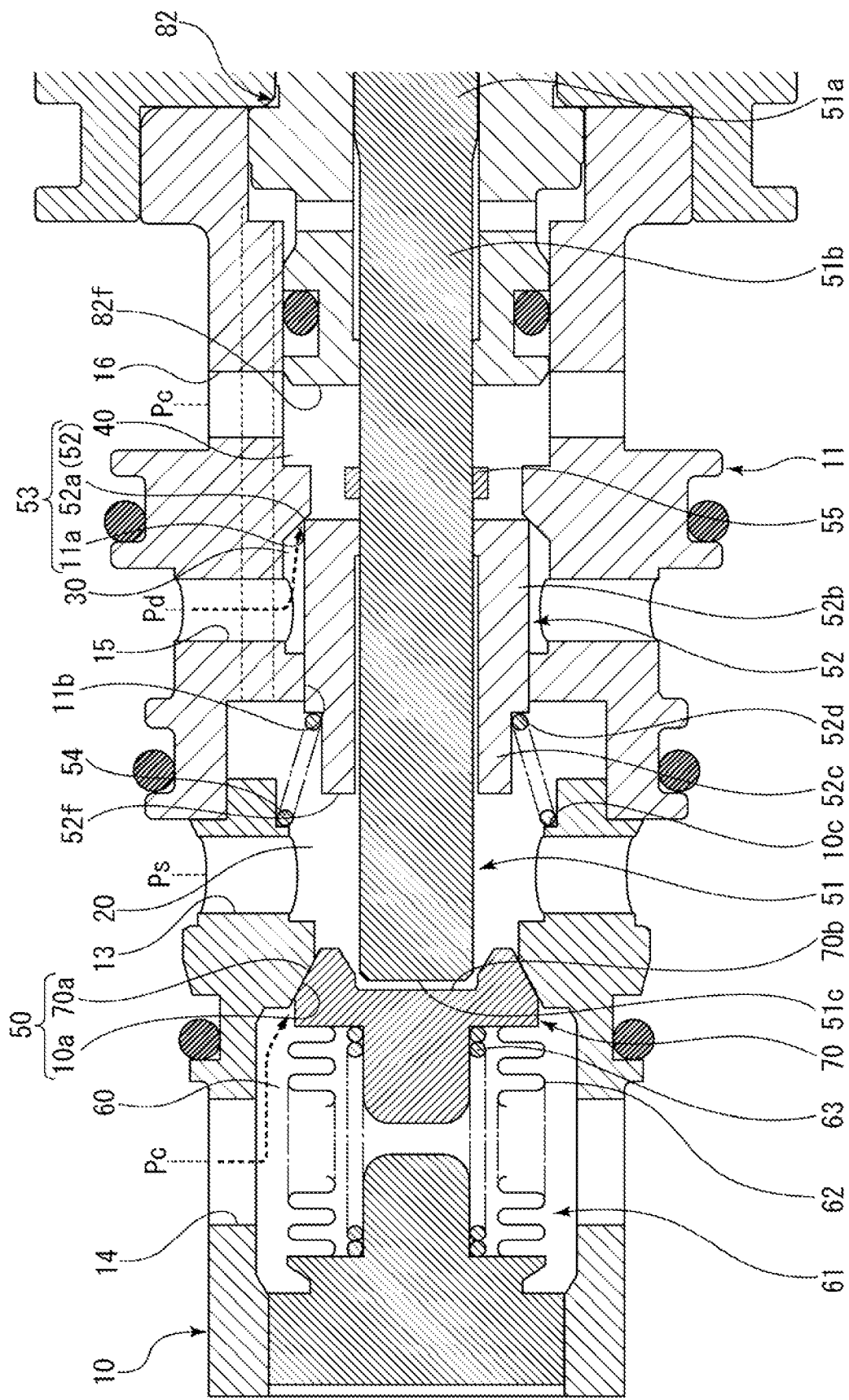
FIG. 3 is an enlarged sectional view of FIG. 2 illustrating a state in which the DC valve is closed and the CS valve is closed in the non-energization state of the capacity control valve of the embodiment.

First, the non-energization state of the capacity control valve V will be described. As illustrated in FIGS. 2 and 3, in the non-energization state of the capacity control valve V, biasing force $F_{sp1}$ of the coil spring 85 forming the solenoid 80 acts rightward in the axial direction on the rod 51, the biasing force $F_{bel}$ of the pressure-sensitive body 61 (i.e., a biasing force by the bellows core 62 and the coil spring 63) acts rightward in the axial direction on the adaptor 70, and biasing force $F_{sp2}$ of the coil spring 54 acts rightward in the axial direction on the DC valve body 52. Thus, the tapered end portion 70a of the adaptor 70 sits on the CS valve seat 10a of the first valve housing 10, the CS valve 50 is closed (e.g., fully closed), a right end 52g of the DC valve body 52 in the axial direction sits on the DC valve seat 11a of the second valve housing 11, and the DC valve 53 is closed (e.g., fully closed). Moreover, in this state, the left end surface of the ring 55, which is fixed to the rod 51, in the axial direction is separated from the right end 52a of the DC valve body 52 in the axial direction.

Next, the energization state of the capacity control valve V will be described. As illustrated in FIG. 4, when electromagnetic force $F_{sol}1$ generated by current application to the solenoid 80 exceeds the biasing force $F_{sp1}$ of the coil spring 85 forming the solenoid 80 in a normal energization state (e.g., in normal control or in so-called duty control) of the capacity control valve V, the movable iron core 84 is attracted to a stationary iron core 82 side, i.e., the left side in the axial direction, against the biasing force $F_{sp1}$ of the coil spring 85, the rod 51 fixed to the movable iron core 84 moves leftward in the axial direction, and the left end 51c of the rod 51 in the axial direction contacts the bottom surface of the recessed portion 70b of the adaptor 70. In this state, the biasing force $F_{sp1}$ of the coil spring 85 forming the solenoid 80 and the biasing force $F_{bel}$ of the pressure-sensitive body 61 (i.e., the biasing force by the bellows core 62 and the coil spring 63) act rightward in the axial direction on the rod 51. That is, force $F_{rod}1 = F_{sp1} + F_{bel}$ acts on the rod 51, supposing that the rightward direction is a positive direction. When electromagnetic force $F_{sol}2$ generated by an increase in energization current for the solenoid 80 exceeds the force $F_{rod}1$, the pressure-sensitive body 61 is pressed and contracted leftward in the axial direction, the tapered end portion 70a of the adaptor 70 is separated from the CS valve seat 10a of the first valve housing 10, and the CS valve 50 transitions from a closed (e.g., fully-closed) state to an open state. Moreover, in this state, the left end surface of the ring 55, which is fixed to the rod 51, in the axial direction is slightly separated from the right end 52a of the DC valve body 52 in the axial direction, and the DC valve 53 is held in the closed (e.g., fully-closed) state.

Figure 5:
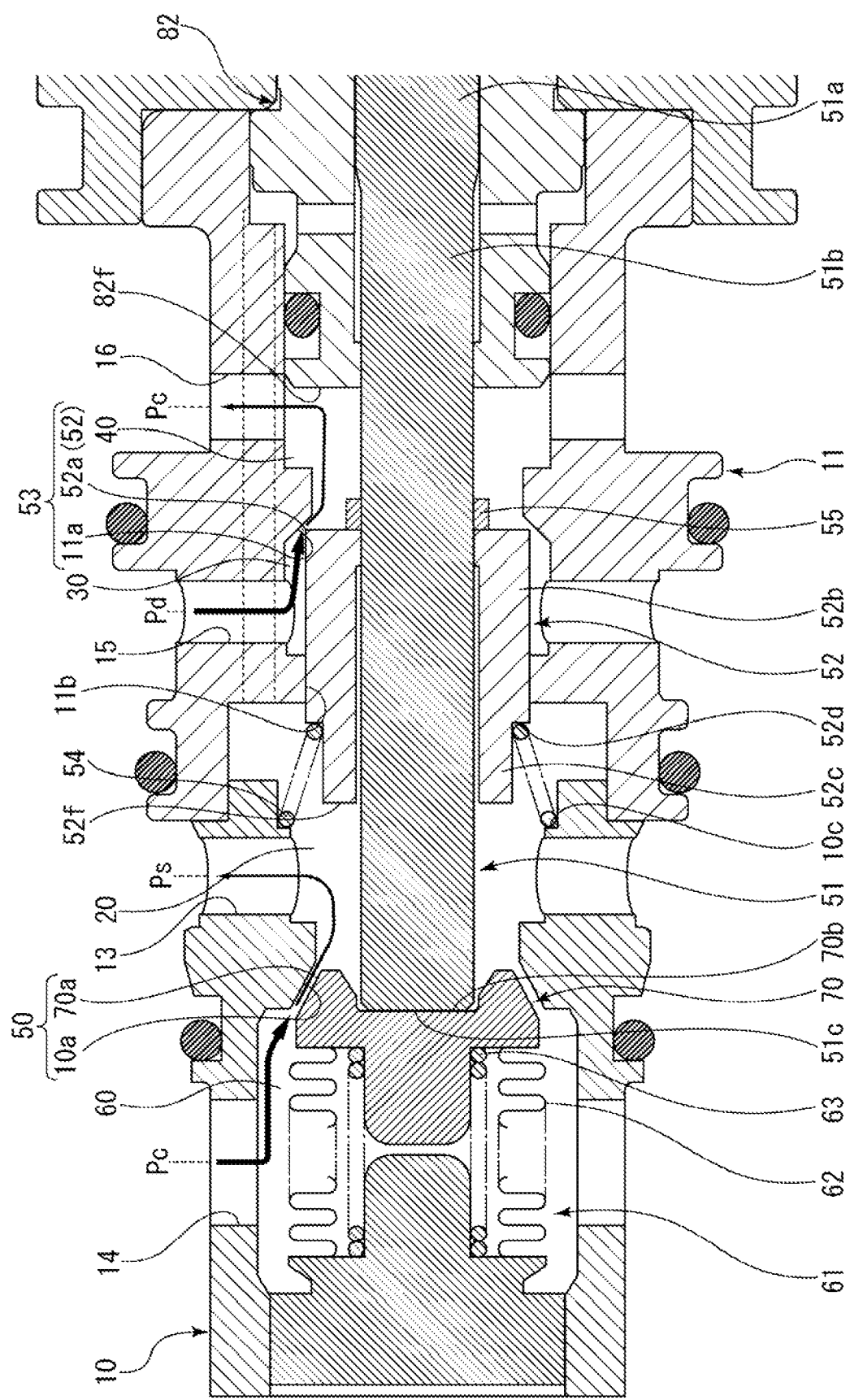
FIG. 5 is a sectional view illustrating a state in which the degrees of opening of the DC valve and the CS valve are adjusted in the energization state (in the normal control) of the capacity control valve of the embodiment.
Figure 6:
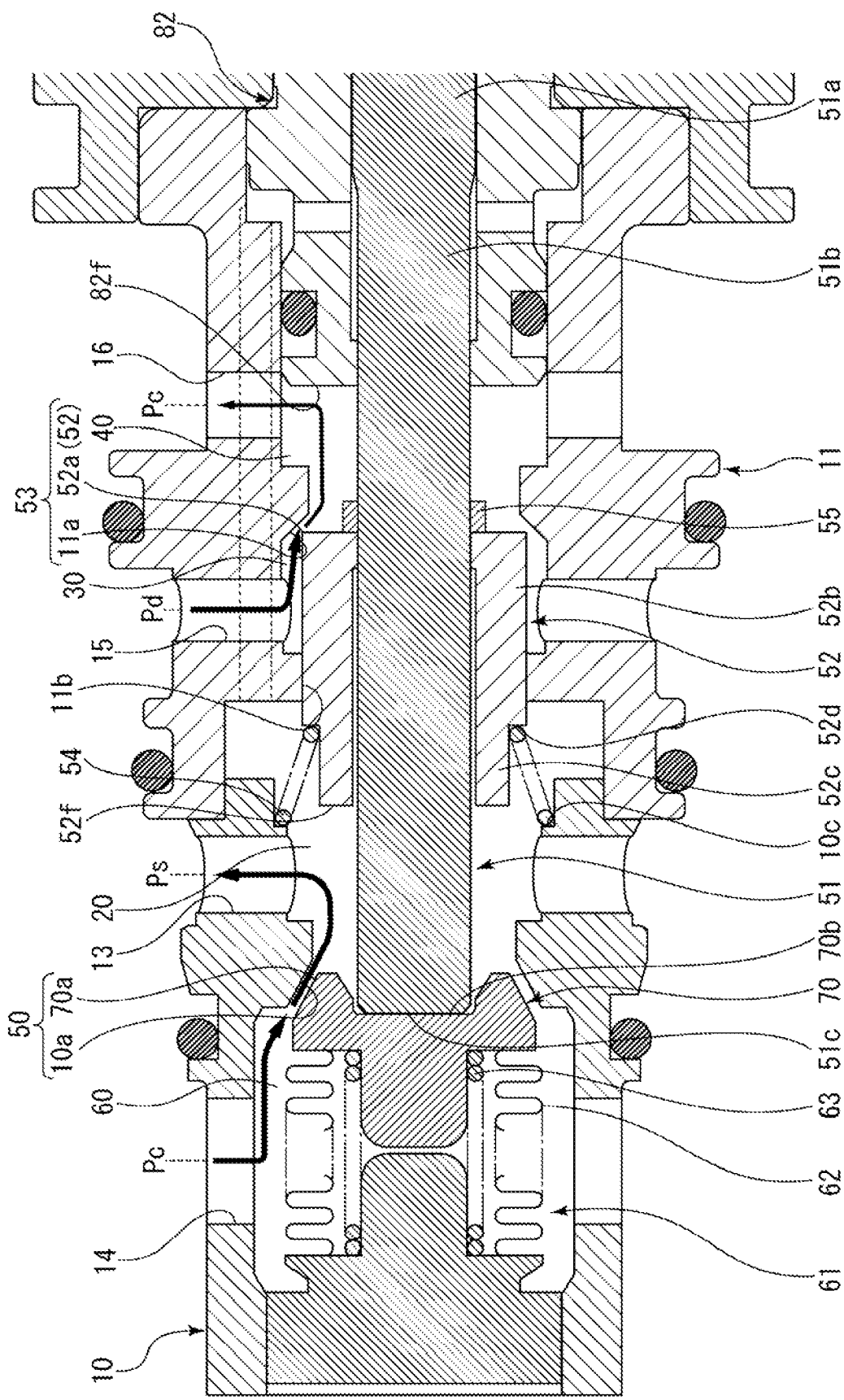
FIG. 6 is a sectional view illustrating a state in which the DC valve is opened and the CS valve is opened in the energization state (in a maximum current state) of the capacity control valve of the embodiment.

As illustrated in FIG. 5, when the energization current for the solenoid 80 is further increased and the CS valve 50 is opened to the predetermined valve opening degree, the left end surface of the ring 55, which is fixed to the rod 51, in the axial direction contacts the right end 52a of the DC valve body 52 in the axial direction. In this state, the biasing force $F_{sp1}$ of the coil spring 85 forming the solenoid 80, the biasing force $F_{bel}$ of the pressure-sensitive body 61 (i.e., the biasing force by the bellows core 62 and the coil spring 63), and the biasing force $F_{sp2}$ of the coil spring 54 act rightward in the axial direction on the rod 51. That is, force $F_{rod}2=F_{sp1}+F_{bel}+F_{sp2}$ acts on the rod 51. When electromagnetic force $F_{sol}3$ generated by an increase in the energization current for the solenoid 80 exceeds the force $F_{rod}2$, the pressure-sensitive body 61 is further contracted, and the CS valve 50 is opened to the predetermined valve opening degree or higher. Moreover, the left end surface of the ring 55, which is fixed to the rod 51, in the axial direction contacts the right end 52a of the DC valve body 52 in the axial direction. Thus, the DC valve body 52 moves leftward in the axial direction, i.e., the opening direction, together with the rod 51, the right end 52a of the DC valve body 52 in the axial direction is separated from the DC valve seat 11a of the second valve housing 11, and the DC valve 53 transitions from the closed (e.g., fully-closed) state to an open state. That is, the DC valve 53 transitions from the closed (e.g., fully-closed) state to the open state behind that of the CS valve 50 (see FIGS. 7 and 8). Further, as illustrated in FIG. 6, when the energization current for the solenoid 80 is increased to the maximum current, the CS valve 50 and the DC valve 53 are both opened to a fully-open state. However, the coil spring 54 is set to have a smaller shrinkage allowance than that of the coil spring 63 of the pressure-sensitive body 61, and therefore, the DC valve 53 is brought into the fully-open state faster than the CS valve 50 (see FIGS. 7 and 8).

According to such a configuration, a refrigerant flow rate is controlled by cooperation of the CS valve 50 and the DC valve 53 in the normal control of the capacity control valve V, and therefore, the control pressure Pc can be efficiently controlled. Further, as the energization current (i.e., a current value) for the solenoid 80 increases, i.e., the stroke of the rod 51 increases, the opening areas of the CS valve 50 and the DC valve 53 increase (see FIGS. 7 and 8). That is, the degree of opening of the CS valve 50 and the degree of opening of the DC valve 53 transition in the same direction in association with an increase in the energization current for the solenoid 80, and the control pressure Pc is controlled based on a difference between the amount of adjustment of the control pressure Pc by the CS valve 50 and the amount of adjustment of the control pressure Pc by the DC valve 53. Thus, the control pressure Pc can be finely controlled in association with the current value.

Moreover, it is configured such that the DC valve 53 transitions from the closed state to the open state behind that of the CS valve 50 and the DC valve 53 is brought into the fully-open state faster than the CS valve 50. Thus, a control range of the control pressure Pc by the CS valve 50 in association with the energization current for the solenoid 80 is broader than a control range of the control pressure Pc by the DC valve 53. That is, control of the refrigerant flow rate from the first Pc port 14 to the Ps port 13 by the CS valve 50 with a smaller required refrigerant flow rate is main, and control of the refrigerant flow rate from the Pd port 15 to the second Pc port 16 by the DC valve 53 with a greater required refrigerant flow rate is auxiliary. Thus, an internal circulating refrigerant flow rate in the normal control of the capacity control valve V can be reduced, and a favorable efficiency for controlling the control pressure Pc is provided. Consequently, an operation efficiency of the variable displacement compressor M can be enhanced. Particularly in about an intermediate range of the energization current for the solenoid 80, i.e., in a range in which the degree of opening of the DC valve 53 is increased for a predetermined period (see FIGS. 7 and 8), the control pressure Pc can be finely controlled in association with the current value.

Further, the CS valve 50 includes the pressure-sensitive body 61 arranged in the pressure-sensitive chamber 60 formed with the first Pc port 14 and configured to bias the rod 51 rightward in the axial direction and the CS valve seat 10a provided at the first valve housing 10. Thus, a structure in which the reactive force provided to the rod 51 according to the suction pressure Ps of the first valve chamber 20 is increased/decreased is made, and controllability of the control pressure Pc is enhanced.

In addition, the DC valve 53 includes the DC valve body 52 slidably fitted onto the rod 51 and the DC valve seat 11a formed at the inner peripheral surface of the second valve housing 11, and therefore, can be simply configured.

Moreover, the DC valve body 52 is biased rightward in the axial direction, i.e., toward a DC valve seat 11a side, by the coil spring 54, and therefore, the closed state can be reliably held upon closing of the DC valve 53. Further, the DC valve body 52 slides, at the inner peripheral surface thereof, on the outer peripheral surface of the small-diameter portion 51b of the rod 51, and the outer peripheral surface of the first cylindrical portion 52b and the guide surface 11b of the second valve housing 11 slide on each other. Thus, relative movement of the DC valve body 52 and the rod 51 in the axial direction can be stabilized.

In addition, in a state in which the first valve housing 10 and the second valve housing 11 are connected and fixed to each other, the first valve chamber 20 communicated with the Ps port 13 and the second valve chamber 30 communicated with the Pd port 15 are partitioned by the first cylindrical portion 52b of the DC valve body 52, and therefore, the capacity control valve V can be simply configured.

Moreover, the ring 55 as another body is fixed to the small-diameter portion 51b of the rod 51, and therefore, leftward movement of the rod 51 in the axial direction, i.e., movement in the opening direction, and leftward movement of the DC valve body 52 in the axial direction, i.e., movement in the opening direction, can be performed. Thus, the open state of the DC valve 53 can be reliably held in the normal energization control (e.g., in the state of equal to or greater than the electromagnetic force $F_{sol}3$) of the capacity control valve V. Consequently, it is not necessary to form, e.g., a flange portion at the rod 51, and the configuration of the rod 51 can be simplified.

Figure 9:
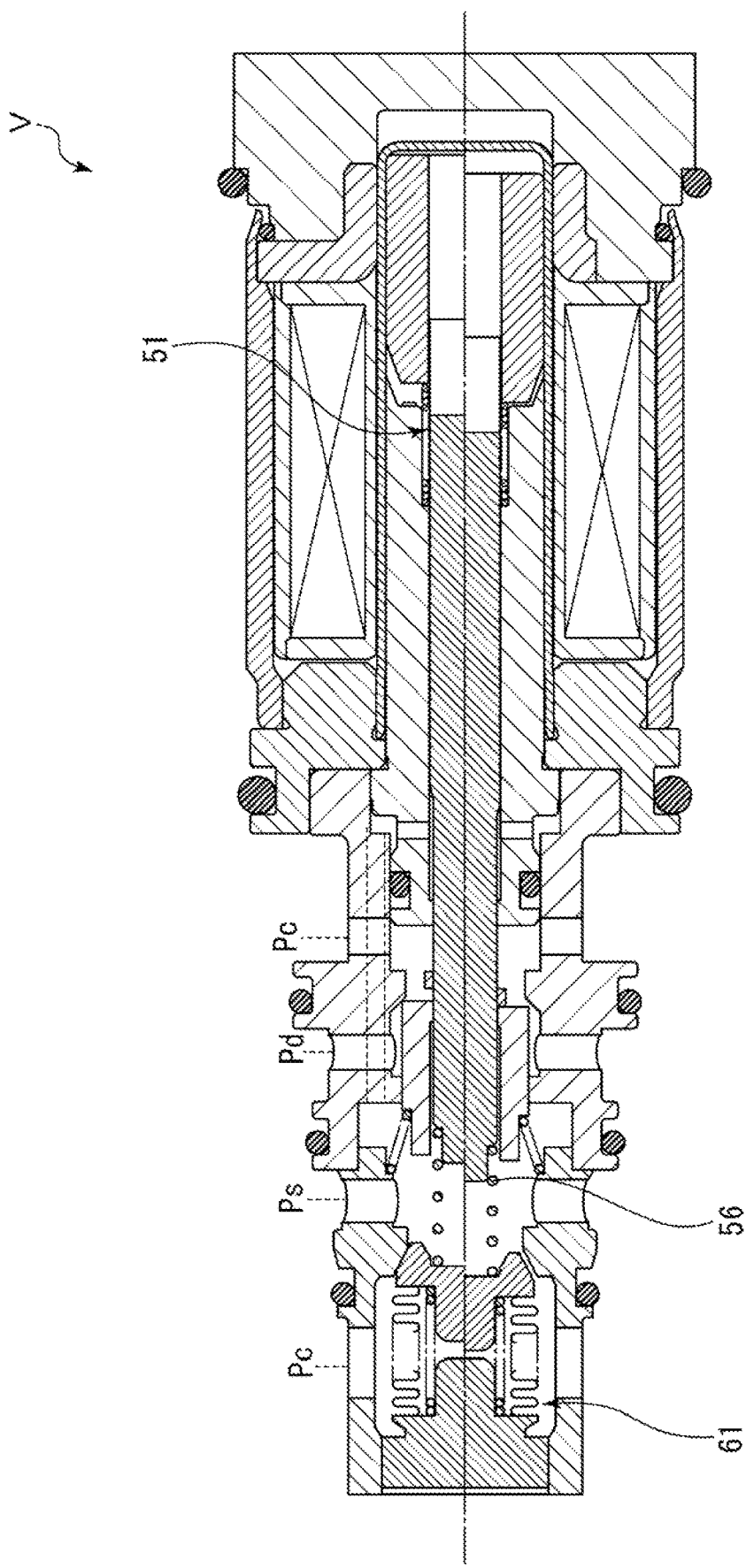
FIG. 9 is a sectional view illustrating a capacity control valve of a variation, an upper view illustrating a state in which a DC valve is closed and a CS valve is closed in a non-energization state and a lower view illustrating a state in which the DC valve is opened and the CS valve is opened in an energization state (a maximum current state) of the capacity control valve.

Further, the example where the drive force of the rod 51 does not act and the pressure-sensitive body 61 does not contract until the left end 51*c* of the rod 51 in the axial direction contacts the bottom surface of the recessed portion 70*b* of the adaptor 70 has been described. However, in the non-energization state, the left end 51*c* of the rod 51 in the axial direction may contact the bottom surface of the recessed portion 70*b* of the adaptor 70, for example. In addition, as in a variation of FIG. 9, a coil spring 56 as a spring configured to provide biasing force in the axial direction may be arranged between the pressure-sensitive body 61 and the rod 51. With the configuration of the variation, the coil spring 56 can deformably move in the axial direction. Thus, even if an axial deformable amount of the pressure-sensitive body 61 is small, the DC valve 53 can be reliably operated.

The embodiment of the present invention has been described above with reference to the drawings, but specific configurations are not limited to such an embodiment. Even changes and additions made without departing from the scope of the present invention are included in the present invention.

For example, the timing of closing the DC valve 53 by the stroke of the rod 51 may be adjusted as necessary in such a manner that arrangement of the DC valve body 52 with respect to the rod 51 in the axial direction, a formation position of the DC valve seat 11*a* in the axial direction at the second valve housing 11, or the dimensions or shape of the DC valve body 52 is changed.

Moreover, the form in which the ring 55 as another body is fixed to the small-diameter portion 51*b* of the rod 51 to restrict rightward movement of the DC valve body 52 in the axial direction, i.e., movement in a closing direction, has been described. However, a portion targeted for restriction is not limited to a ring shape, and may be a C-shape, for example. Further, the portion targeted for restriction may be formed integrally with the rod.

In addition, the coil springs 54, 56 are not limited to the compression springs, and may be tension springs or may be in other shapes than a coil shape.

Moreover, the first valve housing 10 and the second valve housing 11 may be integrally formed.

Further, the example where the coil spring 54 is set to have a smaller shrinkage allowance than those of the coil spring 85 of the solenoid 80 and the coil spring 63 of the pressure-sensitive body 61 and maximization of the degree of opening of the DC valve 53 is restricted has been described. However, such a shrinkage allowance may be set greater, and maximization of the degree of opening of the DC valve 53 is not necessarily restricted.

Figure 10:
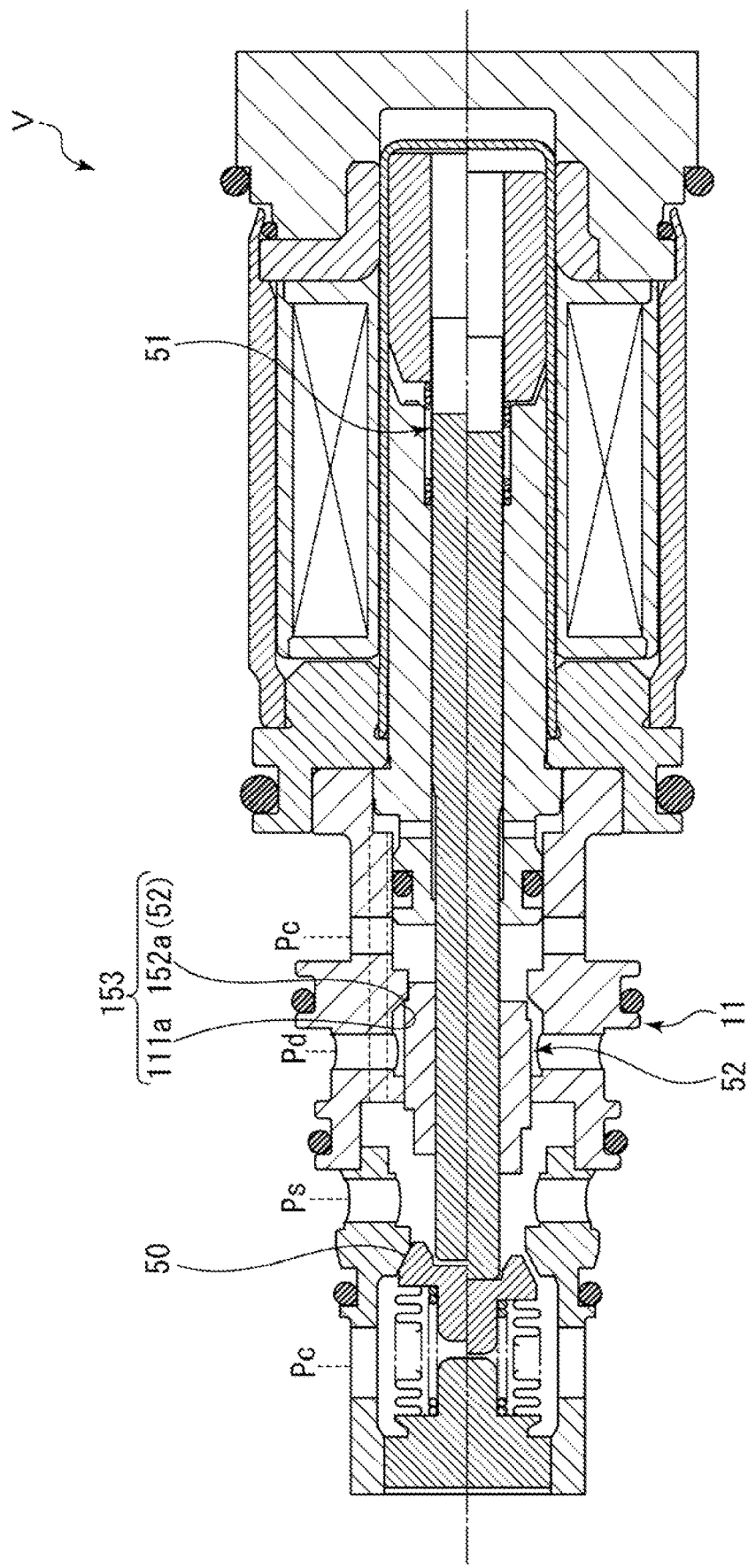
FIG. 10 is a sectional view illustrating a capacity control valve of a variation, an upper view illustrating a state in which a DC valve is closed and a CS valve is closed in a non-energization state and a lower view illustrating a state in which the DC valve is opened and the CS valve is opened in an energization state (e.g., a maximum current state) of the capacity control valve.

In addition, the example where the DC valve 53 is formed using the DC valve body 52 movable relative to the rod 51 has been described, but other configurations may be employed. For example, in a spool valve structure illustrated in FIG. 10, the CS valve 50 may have the same structure as that of the embodiment, a DC valve body 152 may be fixed to the rod 51, and a DC valve 153 of the spool valve structure may be formed by a land portion 152*a* of the DC valve body 152 and an inner peripheral portion 111*a* of the second valve housing 11. In this case, the rod and the DC valve body may be integrally formed.

Moreover, the pressure-sensitive body 61 does not necessarily use the coil spring therein.

REFERENCE SIGNS LIST

1 Casing
2 Discharge chamber
3 Suction chamber
4 Control chamber
10 First valve housing (valve housing)
10*a* CS valve seat
11 Second valve housing (valve housing)
11*a* DC valve seat
11*b* Guide surface
12 Partition adjustment member
13 Ps port (suction port)
14 First Pc port (first control port)
15 Pd port (discharge port)
16 Second Pc port (second control port)
20 First valve chamber
30 Second valve chamber
40 Third valve chamber
50 CS valve
51 Rod
52 DC valve body
52*a* Right end in axial direction
52*b* First cylindrical portion
52*c* Second cylindrical portion
52*d* Side portion
52*f* Left end in axial direction
52*g* Right end in axial direction
53 DC valve
54 Coil spring (spring)
55 Ring
56 Coil spring (spring)
60 Pressure-sensitive chamber
61 Pressure-sensitive body
62 Bellows core
63 Coil spring
70 Adaptor
70*a* Tapered end portion
70*b* Recessed portion
80 Solenoid
82 Stationary iron core
83 O-ring
84 Movable iron core
85 Coil spring
Pc Control pressure
Pd Discharge pressure
Ps Suction pressure
V Capacity control valve

The invention claimed is:

1. A capacity control valve for controlling a flow rate by energization of a solenoid, comprising:
a valve housing formed with a discharge port through which discharge fluid with a discharge pressure passes, a suction port through which suction fluid with a suction pressure passes, and first and second control ports through which control fluid with a control pressure passes;
a rod movably arranged in the valve housing and driven by the solenoid;
a CS valve configured to control a fluid flow between the first control port and the suction port in accordance with a movement of the rod; and
a DC valve configured to control a fluid flow between the second control port and the discharge port in accordance with the movement of the rod,
wherein in a non-energization state of the solenoid, the CS valve is closed and the DC valve is closed,
as the energization of the solenoid becomes larger, the CS valve transitions from a closed state to an open state and the DC valve transitions from a closed state to an open state, in a maximum current state of the solenoid, the CS valve is opened and the DC valve is opened.

2. The capacity control valve according to claim 1, wherein
in the energization of the solenoid, the DC valve is brought into the open state behind that of the CS valve.

3. The capacity control valve according to claim 2, wherein
in the energization of the solenoid, the DC valve is brought into a fully-open state faster than the CS valve.

4. The capacity control valve according to claim 3, wherein
the DC valve includes a DC valve body slidably attached to the rod and a DC valve seat provided at the valve housing.

5. The capacity control valve according to claim 4, wherein
the DC valve body is biased toward a side of the DC valve seat by a spring.

6. The capacity control valve according to claim 5, wherein
a flange portion extending in a radially outward direction and configured to restrict a movement of the DC valve body in a closing direction is formed at the rod.

7. The capacity control valve according to claim 6, wherein
the flange portion is a ring which is formed as a body different from the rod.

8. The capacity control valve according to claim 1, wherein
in the energization of the solenoid, the DC valve is brought into a fully-open state faster than the CS valve.

9. The capacity control valve according to claim 1, wherein
the DC valve includes a DC valve body slidably attached to the rod and a DC valve seat provided at the valve housing.

10. The capacity control valve according to claim 9, wherein
the DC valve body is biased toward a side of the DC valve seat by a spring.

11. The capacity control valve according to claim 10, wherein
the DC valve body is arranged between an outer periphery of the rod and an inner periphery of the valve housing to partition the suction port and the discharge port.

12. The capacity control valve according to claim 9, wherein
a flange portion extending in a radially outward direction and configured to restrict a movement of the DC valve body in a closing direction is formed at the rod.

13. The capacity control valve according to claim 12, wherein
the DC valve body is arranged between an outer periphery of the rod and an inner periphery of the valve housing to partition the suction port and the discharge port.

14. The capacity control valve according to claim 12, wherein
the flange portion is a ring which is formed as a body different from the rod.

15. The capacity control valve according to claim 14, wherein
the DC valve body is arranged between an outer periphery of the rod and an inner periphery of the valve housing to partition the suction port and the discharge port.

16. The capacity control valve according to claim 9, wherein
the DC valve body is arranged between an outer periphery of the rod and an inner periphery of the valve housing to partition the suction port and the discharge port.

17. The capacity control valve according to claim 1, wherein
the CS valve includes a CS valve seat provided at the valve housing and a pressure-sensitive body arranged in a pressure-sensitive chamber formed with the first control port so as to bias the rod.

18. The capacity control valve according to claim 17, wherein
a spring configured to provide a biasing force in an axial direction is arranged between the pressure-sensitive body and the rod.

19. The capacity control valve according to claim 1, wherein
the second control port, the discharge port, the suction port, and the first control port are arranged in description order from a side of the solenoid.

20. A capacity control valve for controlling a flow rate by energization of a solenoid, comprising:
a valve housing formed with a discharge port through which discharge fluid with a discharge pressure passes, a suction port through which suction fluid with a suction pressure passes, and first and second control ports through which control fluid with a control pressure passes;
a rod movably arranged in the valve housing and driven by the solenoid;
a DC valve body partially forming a DC valve arranged at an outer periphery of the rod to control a fluid flow between the second control port and the discharge port;
a spring having a first end brought into contact with an outer periphery portion of the DC valve body and a second end which is opposed to the first end in an axial direction and which is brought into contact with an inner periphery portion of the valve housing, and configured to bias the DC valve body toward a side of the solenoid; and
a pressure-sensitive body partially forming a CS valve configured to control a fluid flow between the first control port and the suction port in accordance with a movement of the rod.

* * * * *